United States Patent
Song et al.

(10) Patent No.: US 10,438,379 B2
(45) Date of Patent: Oct. 8, 2019

(54) IN-RECONSTRUCTION FILTERING FOR POSITRON EMISSION TOMOGRAPHY (PET) LIST MODE ITERATIVE RECONSTRUCTION

(71) Applicant: KONINKLIJKE PHILIPS N.V., Eindhoven (NL)

(72) Inventors: Xiyun Song, Cupertino, CA (US); Jinghan Ye, Cupertino, CA (US); Zhiqiang Hu, Twinsburg, OH (US); Changhong Dai, Willoughby Hills, OH (US); Varun Verma, Cleveland, OH (US); Chi-Hua Tung, Aurora, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 76 days.

(21) Appl. No.: 15/117,550

(22) PCT Filed: Feb. 18, 2015

(86) PCT No.: PCT/IB2015/051235
§ 371 (c)(1),
(2) Date: Aug. 9, 2016

(87) PCT Pub. No.: WO2015/125086
PCT Pub. Date: Aug. 27, 2015

(65) Prior Publication Data
US 2016/0350945 A1    Dec. 1, 2016

Related U.S. Application Data

(60) Provisional application No. 61/941,025, filed on Feb. 18, 2014.

(51) Int. Cl.
*G06T 11/00* (2006.01)
*G06T 5/00* (2006.01)
*G06T 5/20* (2006.01)

(52) U.S. Cl.
CPC .......... *G06T 11/006* (2013.01); *G06T 5/002* (2013.01); *G06T 5/20* (2013.01);
(Continued)

(58) Field of Classification Search
None
See application file for complete search history.

(56) References Cited

U.S. PATENT DOCUMENTS

| 5,416,815 A | 5/1995 | Hsieh |
| 2008/0019607 A1 | 1/2008 | Star-Lack |

(Continued)

OTHER PUBLICATIONS

Hsieh, et al., "Fractional scan algorithms for low-dose perfusion CT", Med. Phys. 31 (5), May 2004.
(Continued)

*Primary Examiner* — Idowu O Osifade

(57) ABSTRACT

A system (10) and a method (100) iteratively reconstruct an image of a target volume of a subject. In each iteration of a plurality of iterations, an estimate image of the target volume (54) is forward projected (58) and compared (62) to received event data (44) to determine a discrepancy (64). The discrepancy (64) is back projected (66) and the back projection (68) updates (70) the estimate image (54). In at least one iteration, the estimate image (54) is filtered (52) in the image domain prior to being back projected.

19 Claims, 6 Drawing Sheets

| Images voxel values | BKG reference | Hot spheres | | | | Cold spheres | |
|---|---|---|---|---|---|---|---|
| | | 10mm | 13mm | 17mm | 22mm | 28mm | 37mm |
| Expected | N/A | 428 | 428 | 428 | 428 | 0 | 0 |
| Post-recon. Gaussian filter | 106.6 | 183.8 | 223.0 | 253.1 | 291.1 | 29.6 | 23.4 |
| In-recon. median filter | 107.0 | 211.0 | 245.6 | 268.8 | 296.7 | 25.7 | 20.7 |
| Improved % | N/A | 15% | 10% | 6% | 2% | -13% | -12% |

(52) U.S. Cl.
CPC ............ *G06T 2207/10104* (2013.01); *G06T 2207/20032* (2013.01); *G06T 2211/424* (2013.01)

(56) References Cited

U.S. PATENT DOCUMENTS

2009/0232375 A1* 9/2009 Ye .................. G01T 1/2985 382/131
2013/0101192 A1* 4/2013 Nakanishi ............ G06T 11/006 382/131

OTHER PUBLICATIONS

Hantos, et al., "Image Enhancement by Median Filters in Algebraic Reconstruction Methods: An Experimental Study", ISVC 2010, Part III, LNCS 6455, pp. 339-348, 2010, Springer-Verlag Berlin Heidelberg.

Slijpen, "Comparison of post-filtering and filtering between iterations for SPECT reconstruction", Nuclear Science, IEEE Transactions on (vol. 46 , Issue: 6 ), Dec. 1999.

Bettindardi, et al., "Implementation and evaluation of an ordered subsets reconstruction algorithm for transmission PET studies using median root prior and inter-update median filtering", Eur J Nucl Med Mol Imaging. Feb. 2003; 30 (2):222-31.

Liang, et al., "Implementation of Non-linear Filters for Iterative Penalized Maximum Likelihood Image Reconstruction" IEEE, 1990.

Lee, et al., "A modified OSEM algorithm for PET reconstruction using wavelet processing", Computer Methods and Programs in Biomedicine, vol. 80, No. 3, Dec. 2005.

Jacobson, et al., "Enhanced 3D PET OSEM reconstruction using inter-update Metz filtering", Physics in Medicine and Biology, Aug. 2000.

Mustafovic, et al., "Object Dependency of Resolution in Reconstruction Algorithms with Interiteration Filtering Applied to PET Data", IEEE Transactions on Medical Imaging, vol. 23, No. 4, Apr. 2004.

* cited by examiner

| Images voxel values | BKG reference | Hot spheres | | | | Cold spheres | |
|---|---|---|---|---|---|---|---|
| | | 10mm | 13mm | 17mm | 22mm | 28mm | 37mm |
| Expected | N/A | 428 | 428 | 428 | 428 | 0 | 0 |
| Post-recon. Gaussian filter | 106.6 | 183.8 | 223.0 | 253.1 | 291.1 | 29.6 | 23.4 |
| In-recon. median filter | 107.0 | 211.0 | 245.6 | 268.8 | 296.7 | 25.7 | 20.7 |
| Improved % | N/A | 15% | 10% | 6% | 2% | -13% | -12% |
FIG. 5
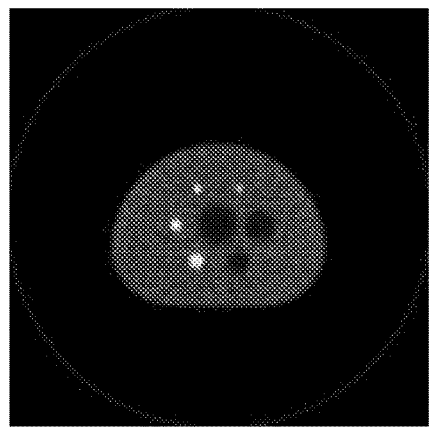 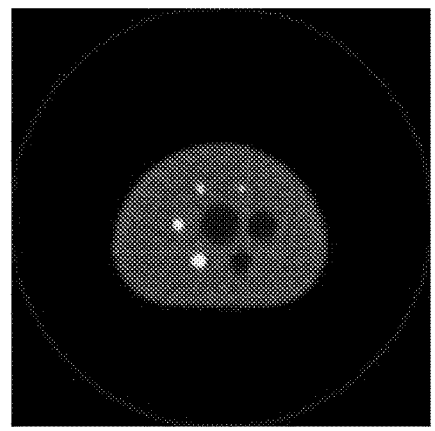
FIG. 6A   FIG. 6B

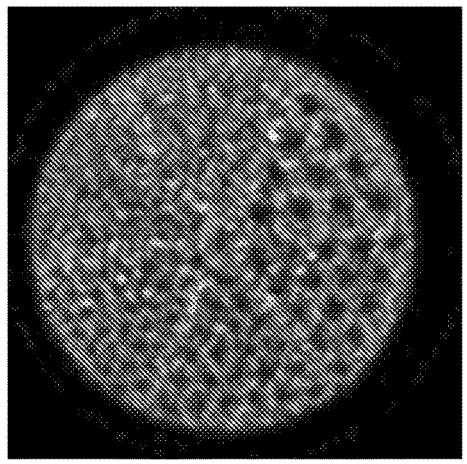
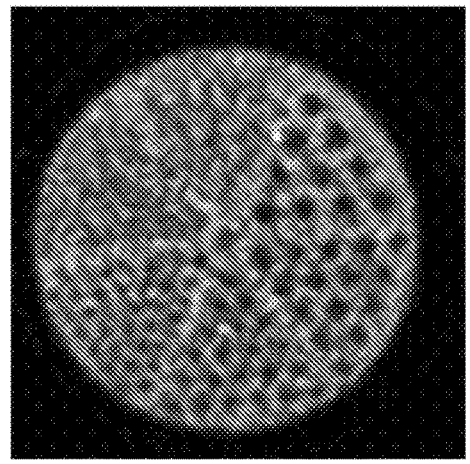
FIG. 7A                FIG. 7B
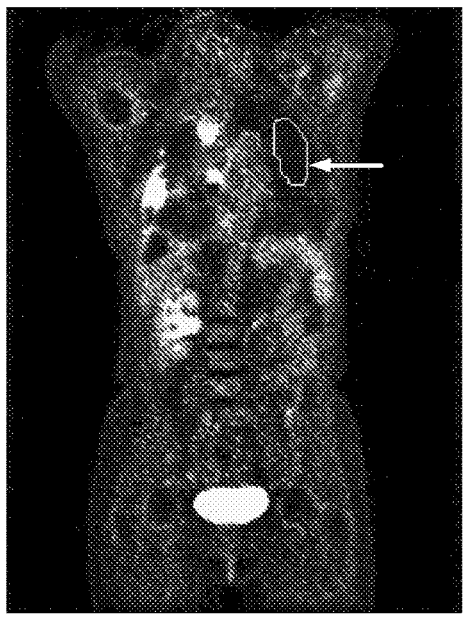
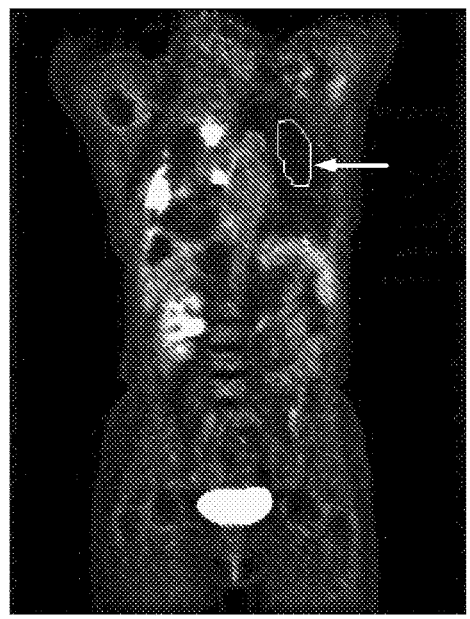
FIG. 8A                FIG. 8B

IN-RECONSTRUCTION FILTERING FOR POSITRON EMISSION TOMOGRAPHY (PET) LIST MODE ITERATIVE RECONSTRUCTION

CROSS REFERENCE TO RELATED APPLICATIONS

This application is the U.S. National Phase application under 35 U.S.C. § 371 of International Application No. PCT/IB2015/051235, filed Feb. 18, 2015, published as WO 2015/125086 on Aug. 27, 2015, which claims the benefit of U.S. Provisional Patent Application No. 61/941,025 filed Feb. 18, 2014. These applications are hereby incorporated by reference herein.

The present application relates generally to diagnostic imaging. It finds particular application in conjunction with positron emission tomography (PET) reconstruction, and will be described with particular reference thereto. However, it is to be understood that it also finds application in other usage scenarios, such as single-photon emission computed tomography (SPECT) reconstruction and x-ray computed tomography (CT) reconstruction, and is not necessarily limited to the aforementioned application.

When the count level of a PET acquisition is low, the image quality reconstructed from the acquired data is often degraded due to the high noise or poor signal to noise ratio (SNR), especially in some total body studies consisting of multiple segments or bed positions. The count levels of PET acquisitions can be low due to limited injection dose, limited acquisition time and attenuation effects.

In the past, filtered-back-projection (FBP) algorithms were widely used for PET reconstruction because FBP algorithms are computationally efficient and straightforward to implement. More recently, with the rapid development of modern computers, iterative-based algorithms have become more commonplace in PET reconstruction. Relative to FBP reconstruction algorithms, iterative-based reconstruction algorithms provide a more accurate modeling of statistics, physical factors and system detection.

In iterative-based reconstruction algorithms, such as the ordered-subset expectation maximization (OSEM), an estimated image typically keeps converging towards a final imaging getting sharper with each update. However, with each update, the noise compounds thus reducing image quality and SNR. To address image noise that accrues during iterative-based reconstruction algorithms, post-reconstruction filters, such as the Gaussian filter, are widely used to smooth reconstructed, final images and reduce the noise levels. Without such filters, the reconstructed, final images might be so noisy that the usefulness in diagnosis is compromised.

With reference to FIG. 1, a block diagram illustrates an iterative-based reconstruction algorithm applying post-reconstruction smoothing to reconstructed images. The parallelograms represent data, and the rectangles represent actions performed on the data. According to the algorithm, an estimate image A of the target volume is forward projected B into a forward projection C in the domain of measured data (e.g., the list-mode domain or the sinogram domain). The forward projection C is then compared D to the measured data E. If the estimate image A were perfect, the forward projection C would match the measured data E and there would be no difference. However, as the estimate image is iteratively built, there is typically a diminishing difference or discrepancy F. The discrepancy F or its inverse is then back projected G to an update matrix H in the domain of the estimate image A and applied to update I the estimate image A. The updated estimate image A is then used for the next iteration.

The foregoing continues until the measured data E and the forward projection C match within an acceptable amount of error or a predetermined number of iterations have been performed. The reconstructed image J (i.e., the updated image estimate at the end of the last iteration) then undergoes post-reconstruction smoothing K to reduce the noise in a reconstructed, final image L.

A challenge with applying post-reconstruction filters to smooth reconstructed images is that the smoothing is typically accompanied by blurring. Further, for relatively small regions of interest (ROI) or objects, such smoothing tends to result in changes in the standardized uptake value (SUV) or mean values in the ROIs, which often causes concerns about its quantitative accuracy. Hence, noise can be controlled by applying a post-reconstruction filter to smooth reconstructed images, but typically at the cost of a loss in image resolution, contrast, and quantitative accuracy.

Iterative-based reconstruction algorithms typically use sinogram data. For such algorithms employing sinogram data, an alternative to post-reconstruction filters is to apply filters in the sinogram (or projection) domain during reconstruction. One such algorithm making use of such filters is the so called "match filter" method. Applying filters during reconstruction in this way addresses some of the concerns above. However, iterative-based reconstructions algorithms have begun moving away from sinogram data to list-mode data. List-mode data provides some unique advantages, such as time-of-flight (TOF) data.

The present application provides a new and improved system and method which overcome these problems and others.

In accordance with one aspect, a system for iteratively reconstructing an image of a target volume of a subject is provided. The system includes a reconstruction processor which, for each of a plurality of iterations, refines an estimate image of the target volume by comparing the estimate image to measured data. The reconstruction processor further filters the estimate image in the image domain for select refinement iterations to control noise.

In accordance with another aspect, a method for iteratively reconstructing an image of a target volume of a subject is provided. Event data describing the target volume is received. An estimate image of the target volume is iteratively refined through repeated comparison of the estimate image to the received event data. The estimate image is filtered in the image domain during at least one select refinement iteration to control noise.

In accordance with another aspect, a system for iteratively reconstructing an image of a target volume of a subject is provided. The system includes a reconstruction processor. The reconstruction processor receives event data describing the target volume. The reconstruction processor further iteratively refines an estimate image of the target volume through repeated comparison of the estimate image to the received event data and filters the estimate image in the image domain during select refinement iterations to control noise.

One advantage resides in increased image quality even with sparse data.

Another advantage resides in increased image resolution.

Another advantage resides in increased signal to noise ratio (SNR).

Another advantage resides in increased quantitative accuracy.

Another advantage resides in increased contrast.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIG. 5 illustrates a table describing a quantitative comparison of International Electrotechnical Commission (IEC) phantom images generated using an in-reconstruction median filter and a post-reconstruction Gaussian filter.

FIG. 6A illustrates a 2 millimeter (mm) resolution reconstructed image of a target volume generated without an in-reconstruction median filter.

FIG. 6B illustrates a 2 mm resolution reconstructed image of the target volume of FIG. 6A generated with an in-reconstruction median filter.

FIG. 7A illustrates a 2 mm resolution reconstructed image of a target volume generated without an in-reconstruction median filter.

FIG. 7B illustrates a 2 mm resolution reconstructed image of the target volume of FIG. 7A generated with an in-reconstruction median filter.

FIG. 8A illustrates a 2 mm resolution reconstruction from a digital, whole-body positron emission tomography (PET) scan generated without an in-reconstruction median filter.

FIG. 8B illustrates a 2 mm resolution reconstructions from the PET scan of FIG. 8A generated with an in-reconstruction median filter.

The present application employs an in-reconstruction filter, typically an in-reconstruction median filter, for each update (typically iteration) performed using data stored in a list-mode, iterative-based reconstruction algorithm. The filtering advantageously maintains the balance of noise control and resolution preservation. Further, the filtering allows the use of higher iterations to achieve better convergence to true quantitation without image quality degradation due to noise. In the case of blob-based iterative reconstruction, the in-reconstruction filter also enables the use of smaller blob sizes and increments to achieve sharper images without increasing noise. Even more, the filtering improves the quantitative accuracy of the standardized uptake values (SUVs) and/or voxel values in relatively small objects as compared to typical post-reconstruction filters.

Figure 1:
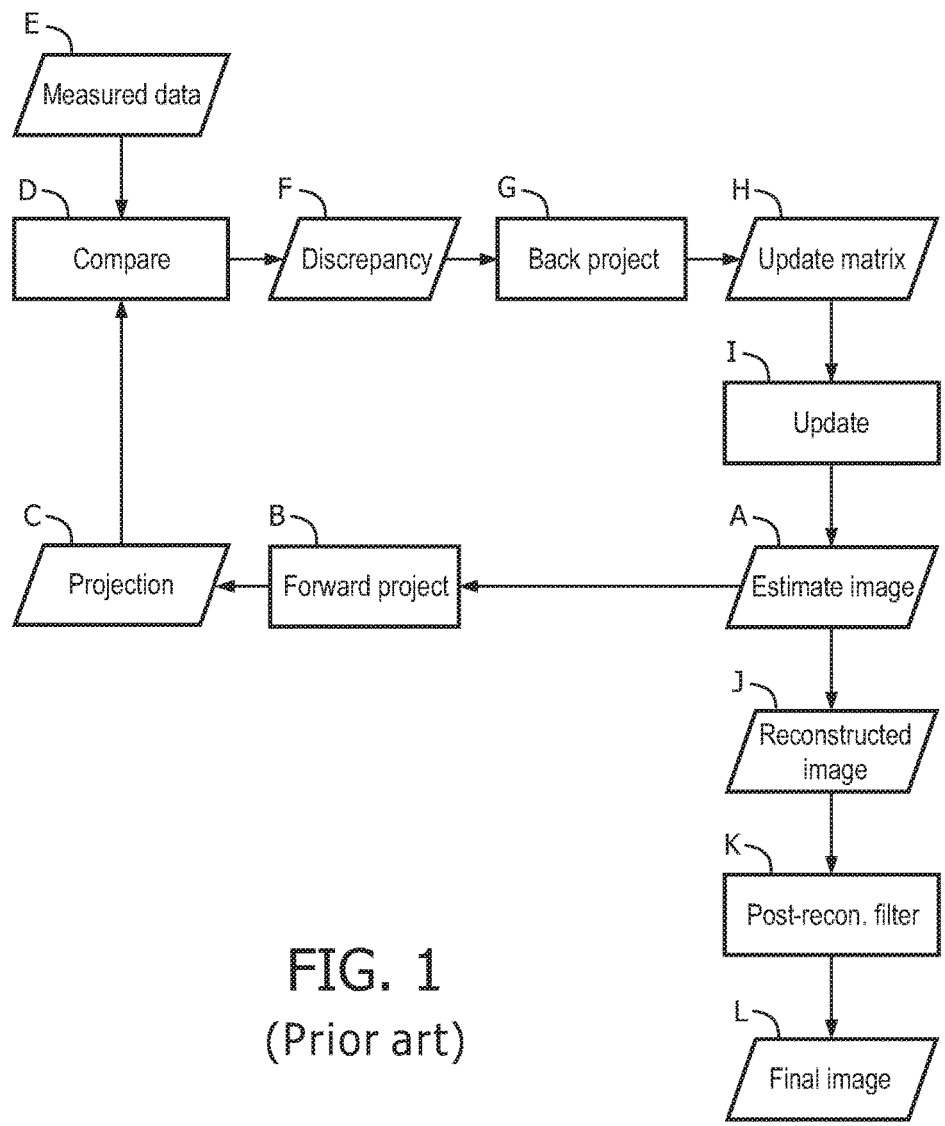
FIG. 1 illustrates a prior art iterative-based reconstruction algorithm using a post-reconstruction filter for smoothing.
Figure 2:
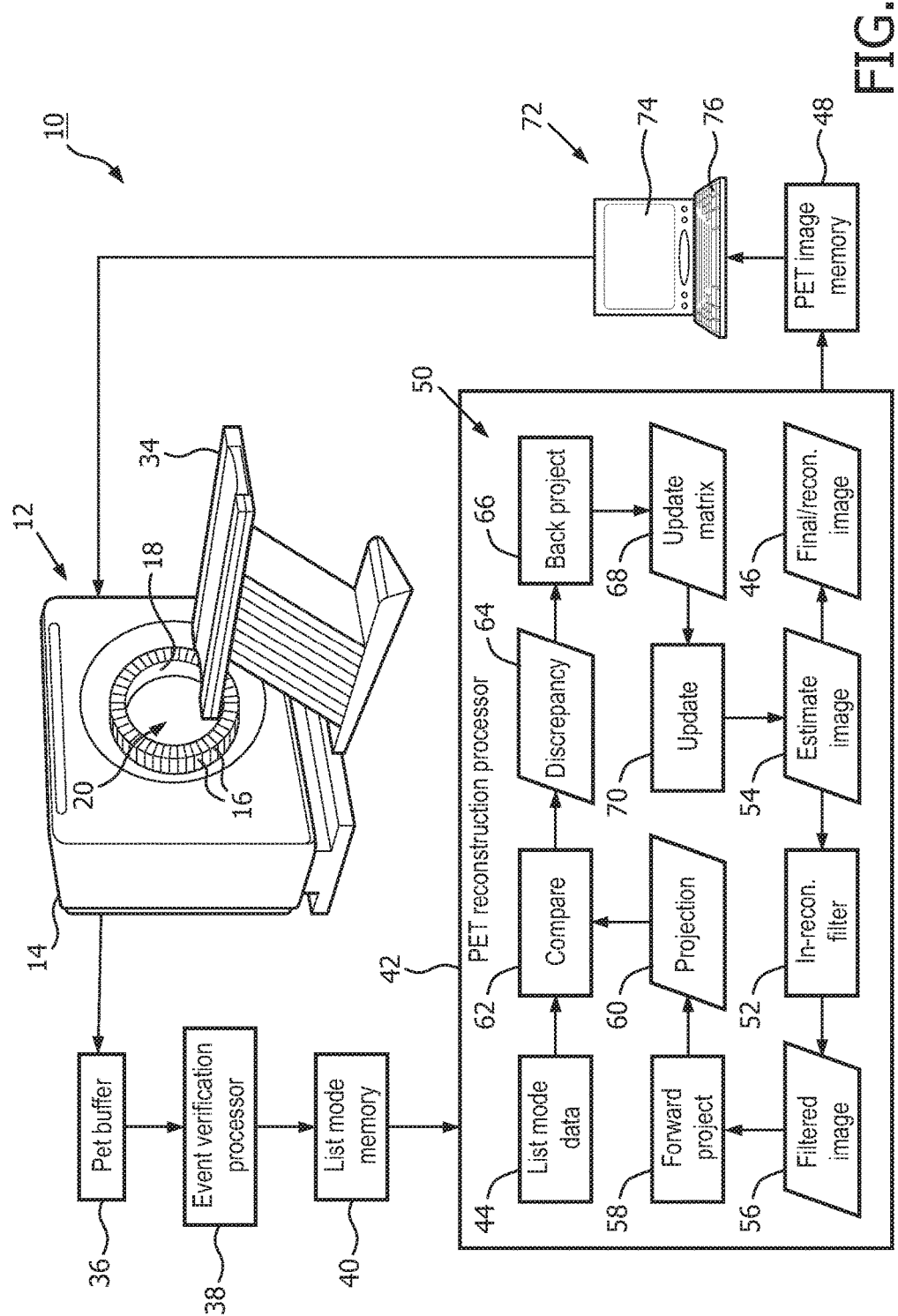
FIG. 2 illustrates a nuclear imaging system with an iterative-based reconstruction system using an in-reconstruction filter for smoothing.

With reference to FIG. 2, a nuclear imaging system 10 employing a nuclear imaging modality to image a subject is provided. The nuclear imaging modality uses radiation, such as gamma photons, received from a target volume of the subject for imaging. Examples of such nuclear imaging modalities include positron emission tomography (PET) and single-photon emission computed tomography (SPECT). As illustrated, the system 10 is a PET imaging system.

The system 10 includes a nuclear scanner 12, illustrated as a PET scanner. The nuclear scanner 12 generates raw scan data and includes a stationary gantry 14 housing a plurality of gamma detectors 16 arranged around a bore 18 of the scanner 12. The bore 18 defines an examination volume 20 for receiving a target volume of a subject to be imaged, such as a brain, torso, or the like. The detectors 16 are typically arranged in one or more stationery rings which extend the length of the examination volume 20. However, rotatable heads are also contemplated. The detectors 16 detect gamma photons from the examination volume 20 and generate the raw scan data.

Figure 3:
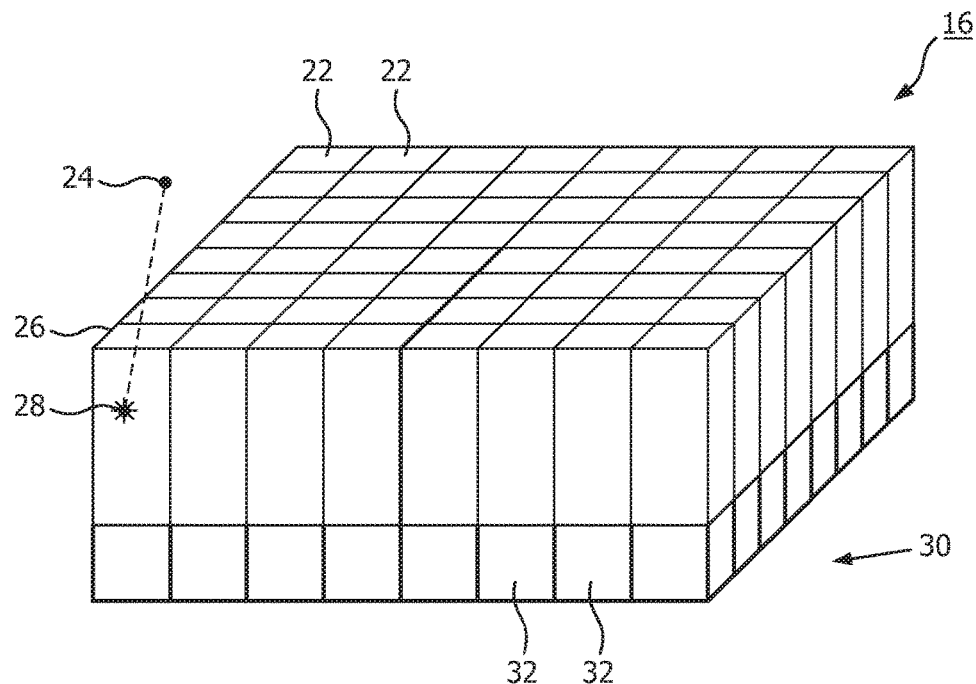
FIG. 3 illustrates a detector of the nuclear imaging system of FIG. 2.

With reference to FIG. 3, each of the detectors 16 includes one or more scintillators 22 arranged in a grid. The scintillators 22 scintillate and generate visible light pulses in response to energy depositions by gamma photons. As illustrated, a gamma photon 24 deposits energy in a scintillator 26, thereby resulting in a visible light pulse 28. The magnitude of a visible light pulse is proportional to the magnitude of the corresponding energy deposition. Examples of scintillators 22 include sodium iodide doped with thallium (NaI(Tl)), cerium-doped lutetium yttrium orthosilicate (LYSO) and cerium doped lutetium oxyorthosilicate (LSO).

In addition to the scintillators 22, the detectors 16 each includes a sensor 30 detecting the visible light pulses in the scintillators 22. The sensor 30 includes a plurality of light sensitive elements 32. The light sensitive elements 32 are arranged in a grid of like size as the grid of scintillators 22 and optically coupled to corresponding scintillators 22. Suitably, there is often a one-to-one correspondence between the scintillators 22 and the light sensitive elements 32, as illustrated, but other correspondences are contemplated. In the illustrated embodiment, the light sensitive elements 32 are silicon photomultipliers (SiPMs), but photomultiplier tubes (PMTS) are also contemplated.

Where the light sensitive elements 32 are SiPMs, there is often a one-to-one correspondence between the scintillators 22 and the light sensitive elements 32, as illustrated. Each of the SiPMs includes a photodiode array (e.g., Geiger-mode avalanche photodiode arrays), each photodiode corresponding to a cell of the photodiode array. Suitably, the SiPMs 32 are configured to operate in a Geiger mode to produce a series of unit pulses to operate in a digital mode. Alternatively, the SiPMs can be configured to operate in an analog mode. Where the light sensitive elements 32 are PMTs, there is often a many-to-one correspondence between the scintillators 22.

Referring back to FIG. 2, during a scan of a subject using the scanner 12, a target volume of the subject is injected with a radiopharmaceutical or radionuclide. The radiopharmaceutical or radionuclide emits gamma photons, or causes gamma photons to be emitted, from the target volume. The target volume is then positioned in the examination volume 20 using a subject support 34 corresponding to the scanner 12. Once the target volume is positioned within the examination volume 20, the scanner 12 is controlled to perform a scan of the target volume and event data is acquired. The acquired event data describes the time, location and energy of each scintillation event detected by the detectors 16 and is suitably stored in a data buffer 36, illustrated as a PET data buffer.

Subsequent to acquisition, or concurrently therewith, an event verification processor 38 filters the buffered event data. The filtering includes comparing energy (cell counts in the digital mode) of each scintillation event to an energy window, which defines the acceptable energy range for scintillation events. Those scintillation events falling outside the energy window are filtered out. Typically, the energy window is centered on the known energy of the gamma photons to be received from the examination volume 20 (e.g., 511 kiloelectron volt (keV)) and determined using the full width half max (FWHM) of an energy spectrum generated from a calibration phantom.

For PET imaging, the event verification processor 38 further generates lines of response (LORs) from the filtered event data. A LOR is defined by a pair of gamma photons striking the detectors 16 within a specified time difference of each other (i.e., a coincident event). The specified time difference is small enough to ensure the gammas are from the same annihilation event. For SPECT imaging, the event verification processor 38 further generates a projection line or small-angle cone (generally referred to as a "projection"). A projection is defined by a gamma photon striking the detectors 16. For simplicity sake, it can be assumed that there is a one-to-one correspondence between scintillation events and gamma photons striking the detectors 16. However, those skilled in the art will appreciate that in practice, a gamma photon can yield multiple scintillation events, gamma photons can exit the scanner 12 without striking the detectors 16, gamma photons can be scattered, and the like. The LORs or the projections are stored in a list of a list mode memory 40. Each list item corresponds to a LOR or a projection.

A reconstruction processor 42, illustrated as a PET reconstruction processor, reconstructs list mode data 44 (i.e., a list of projections or LORs, depending upon the imaging modality) into a final, reconstructed image 46 of the target volume. The list mode data 44 is typically received from the list mode memory 40. The reconstructed image 46 is typically stored in an image memory 48, illustrated as a PET image memory. To generate the reconstructed image 46, the reconstruction processor 42 employs an iterative-based reconstruction algorithm 50 in which an in-reconstruction filter 52 is employed. A block diagram of the algorithm 50 is shown within the reconstruction processor 42, where the parallelograms represent data and the rectangles represent actions performed on the data According to the reconstruction algorithm 50, an estimate image of the target volume f(k) 54 is iteratively refined based on the list mode data 44. f( ) corresponds to a function modeling the estimate image 54 as a function of the iteration, k corresponds to an index of the current iteration increasing from 1 to n by an increment of 1 for each iteration, and n corresponds to the total number of iterations. Initially, for the first iteration, the estimate image f(1) 54 can be anything. For example, it can be a randomly generated image, a homogeneous image, an image of a target volume of an average patient corresponding to the target volume being reconstructed, or the like. The iterations continue until termination criteria are met. Such termination criteria include reaching a predetermined number of iterations and/or the estimate image f(k) 54 matching the list mode data within an acceptable discrepancy.

For each iteration k, the filter 52 may be applied to the estimate image f(k) 54 to smooth noise while try to preserve edge sharpness. The filter can be applied for every iteration or only for select iterations. For example, the filter can be applied every other iteration. Typically, the filter 52 is a median filter, but any other type of filter, such as a window filter or a Gaussian filter, can be employed so long as it controls noise. The filter 52 is typically selected depending on the individual cases and needs. For example, if the noise is grainy or salt-like, a median filter could be used to smooth out the noise while preserving object edges. In this example, the median values can be searched within nearby neighbors.

Figure 4:
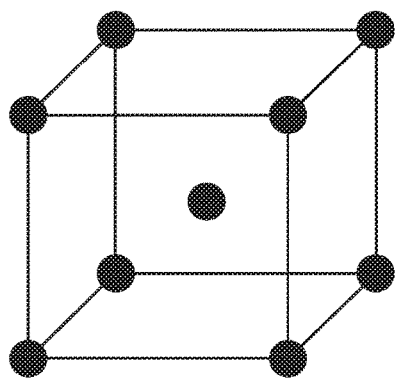
FIG. 4 illustrates an example of selecting the median value searching neighbors of a median filter.

In some situations, the activity distribution is represented as two or more interleaved image matrices, and then the median value searching range can be across these matrices, as illustrated in FIG. 4.

With reference to FIG. 4, an example of selecting the median value searching neighbors is provided. The estimate of activity is presented as two interleaved images. Each voxel from one image (i.e., the central sphere) is surrounded by 8 equally-distanced voxels from the other image (i.e., the spheres surrounding the central sphere). Thus, these 9 voxels can be used for the searching range. In other instances, such as a single image presentation of the activity estimate, each voxel is surrounded by the 6 closest voxels. Thus, these 7 voxels can be used as the searching ranges. In other instances, for stronger smoothing effect, another 12 next-closest voxels can be included into the searching range, and so on. The bigger the searching range, the stronger the smoothing effect.

Referring back to FIG. 2, the filter image 56 or, if the estimate image f(k) 54 was not filtered, the estimate image f(k) 54, is forward projected 58 onto the domain of the list mode data 44 (i.e., the list mode data space). This includes computing an estimated value for every list item in the list mode data 44. As described above, each list item of the list mode data corresponds to an event. For PET, a list item corresponds to a LOR, which is defined by a coincident event. For SPECT, a list item corresponds to a projection, which is defined by a gamma striking the detectors 16. The estimate for a list item is an intensity that would be measured if the volume represented by the filter image 56 or, if the estimate image f(k) 54 was not filtered, the estimate image f(k) 54, was placed within the bore 20. The forward projection 60 is suitably represented by a function PO modeling the projection 60 as a function of the iteration.

The forward projection P(k) 60 is compared 62 to the list mode data 44 event-by-event. That is to say, each list item of the list mode data is compared to the corresponding estimate in the forward projection P(k) 60. If the estimate image f(k) 54 were perfect, the forward projection P(k) 60 would match the list mode data 44 and there would be no difference. However, as the estimate image f(k) 54 is being built, there typically is a difference or error. The discrepancy 64 is then back projected 66 into the domain of the estimate image f(k) 54 to yield an update matrix 68. This update matrix 68 is applied to update 70 the estimate image f(k) 54 to create an updated estimate image f(k+1) 54 for the next iteration.

In some instances, each iteration k includes a plurality of sub iterations. In that regard, the list mode data 44 is divided into chunks or subsets. For each iteration k, the chunks or subsets are iterated over with each chuck or subset being processed in the same manner as above, except that each sub-iteration employs an estimate image f(k, j) 54. f( ) corresponds to a function modeling the estimate image 54 as a function of the iteration and sub-iteration, k is as described above, j corresponds to an index of the current sub-iteration increasing from 1 to m by an increment of 1 for each sub iteration, and m corresponds to the total number of sub-iterations. As should be appreciated, the estimate image f(k, 1) 54 is the same as the estimate image f(k) 54, described above.

For each chunk or subset j, the filter 52 may be applied to the estimate image f(k, j) 54 to smooth noise while try to preserve edge sharpness. The filter 52 can be applied for every sub-iteration or only for select sub-iterations. For example, the filter 52 can be applied every other sub-iteration. The selection criteria can be based upon the index of the iteration, the index of the sub-iteration, or both indexes of the iteration and the sub-iteration. The filter image 56 or, if the estimate image f(k, j) 54 was not filtered, the estimate image f(k) 54, is forward projected 58 onto the domain of the chunk or subset (i.e., the list mode data space). This includes computing an estimated value for every list item in the chunk or subset. The forward projection 60 is suitably represented by a function PO modeling the projection as a function of the iteration and the sub-iteration. The projection P(k, j) is compared 62 to the chunk or subset, the discrepancy 64 is back projected 66 and the resulting update matrix 68 is applied to update 70 the estimate image f(k, j) 54 and to create a updated estimate image f(k, j+1) 54 for the next sub-iteration.

By applying filtering multiple times during the iterative updates, the noise accumulated from previous updates is efficiently reduced. This allows further forward-and-back-projection operations to apply adjustments based on the true measurements. Further adjustments yield further convergence and better resolution without suffering from increased noise level. In the case of blob-based reconstruction, the in-reconstruction filter also enables the use of smaller blob sizes and increments to achieve sharper images without increasing noise. Even more, the filtering improves the quantitative accuracy of the standardized uptake values (SUVs) and/or voxel values in relatively small objects as compared to typical post-reconstruction filters With reference to FIG. 5, a table provides a quantitative comparison of International Electrotechnical Commission (IEC) phantom images generated using an in-reconstruction median filter and a post-reconstruction Gaussian filter. The IEC phantom images were generated using both filtering techniques for each of 10 millimeter (mm), 13 mm, 17 mm, and 22 mm spheres uniformly emitting gamma photons (i.e., hot spheres). The IEC phantom images were further generated using both filtering techniques for each of 28 mm and 37 mm spheres which do not emit gamma photons (i.e., cold spheres). For each of these hot and cold spheres, the expected voxel value, the measured voxel value using an in-reconstruction median filter, the measured voxel value using a post-reconstruction Gaussian filter, and the percent improvement between the in-reconstruction and post-reconstruction filtering are shown. The background (BKG) reference values are also shown for the IEC phantom images.

With reference to FIGS. 6A, 6B, 7A and 7B, 2 mm reconstructions generated with an in-reconstruction median filter and without such a filter are illustrated. FIG. 6A illustrates a reconstructed image of a target volume generated without an in-reconstruction median filter, and FIG. 6B illustrates a reconstructed image of the same target volume as FIG. 6A generated with an in-reconstruction median filter. FIG. 7A illustrates a reconstructed image of a target volume generated without an in-reconstruction median filter, and FIG. 7B illustrates a reconstructed image of the same target volume as FIG. 7A generated with an in-reconstruction median filter.

With reference to FIGS. 8A and 8B, 2 mm reconstructions from a digital, whole-body PET scan are illustrated. The reconstructions were generated using an iterative-based reconstruction algorithm with an in-reconstruction median filter and without such a filter. Further, the reconstructions used 3 iterations and 33 subsets (i.e., the same blob radius and increment). FIG. 8A illustrates a reconstruction generated without an in-reconstruction median filter. A segmented voxel (emphasized by an arrow) had a mean value of 11.02, a standard deviation of 4.25, a minimum value of 2 and a maximum value of 30. FIG. 8B illustrates a reconstruction generated with an in-reconstruction median filter. The same segmented voxel as FIG. 8A (emphasized by an arrow) had a mean value of 10.93, a standard deviation of 3.32, a minimum value of 4 and a maximum value of 29. Hence, the in-reconstruction filter reduced noise as evident by the reduction in the standard deviation.

Referring back to FIG. 2, a control system 72, such as a computer, of the system 10 provides a graphical user interface (GUI) to users of the system 10. The GUI makes use of a display device 74 and a user input device 76 to allow the users to interact with the control system 72. By way of the GUI, the control system 72 can be employed to control the scanner 12 to image a subject. For example, the user can coordinate a PET image of a target volume of the subject. Further, by way of the GUI, the control system 72 can be employed to view and, optionally, manipulate images stored in the image memory 48. For example, an image of the image memory can be displayed on the display device 74.

In some instances, one or more of the data buffer 36, the reconstruction processor 42, the image memory 48, and the event verification processor 38 are integrated with the control system 72. For example, the reconstruction processor 42 and the event verification processor 38 can share a common processor of the control system 72. In such instances, the reconstruction processor 42 and the event verification processor 38 are typically implemented as software modules. The software modules are stored on a memory of the control system 72 and executed by a processor of the control system 72.

In view of the foregoing discussion, the present application describes a list-mode, iterative-based reconstruction algorithm 50 for nuclear imaging, such as SPECT or PET imaging. While the discussion was limited to nuclear imaging, it should be appreciated that the algorithm 50 can also be applied to other types of imaging, such as x-ray computed tomography (CT). Further, while the discussion was limited to list-mode data 44, it should be appreciated that the algorithm 50 can also be applied to sinogram data. That is to say, instead of forward projecting the estimate image 54 to the list-mode domain, the estimate image is forward projected to the sinogram domain. Further, instead of back projecting the discrepancy from the list-mode domain, the discrepancy is back projected from the sinogram domain. The remainder of the algorithm 50 is the same.

Even more, while the in-reconstruction filter 52 is typically applied to a 1-step-acquition study, it can also be applied to studies requiring addition acquisition steps. For example, the in-reconstruction filter 52 can be applied to a 2-step-acquisition study, such as the varying speed continuous bed motion acquisition. In a typical 2-step-acuisition study, the first acquisition is short and the data is pretty noisy. The data from the first acquisition is reconstructed using the in-reconstruction filter 52 simply to provide a scout view for the sequential, second acquisition. The second acquisition is long and planned based on information obtained from the scout view.

Figure 9:
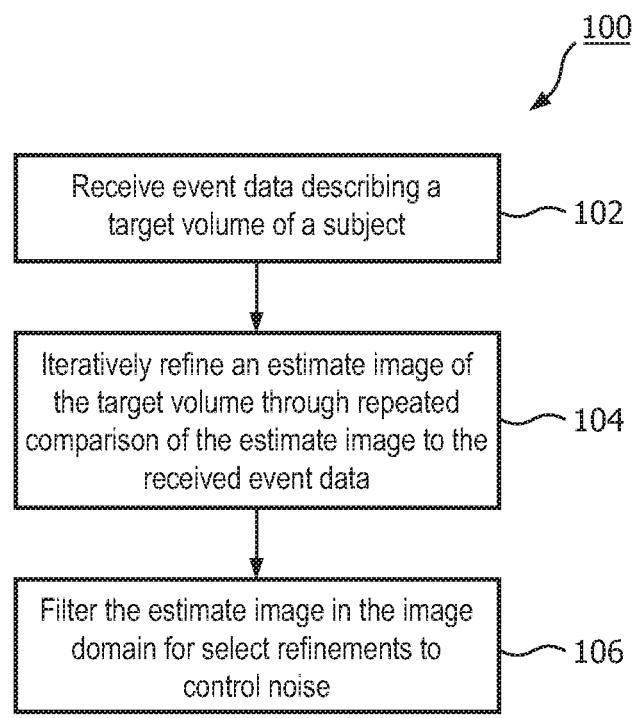
FIG. 9 illustrates a method for iteratively reconstructing an image of a target volume of a subject.

With reference to FIG. 9, a method 100 for iteratively reconstructing an image of a target volume of a subject is provided. The method 100 is suitably performed by the reconstruction processor 42. In that regard, the method 100 is typically embodied by processor executable instructions stored on a memory and executed by the processor 42.

According to the method 100 event data 44 in either the list-mode domain or the sinogram domain is received 102, typically from an imaging scanner 12. The event data 44 describes the target volume. For PET, the event data 44 describes the target volume by annihilation events in the target volume. For SPECT, the event data 44 describes the target volume by gamma photons emitted from the target volume. An estimate image 54 of the target volume is then iteratively refined 104 through repeated comparison of the estimate image 54 to the received event data 44. As described above, this typically includes repeatedly: 1) forward projecting the estimate image 54 to the domain of the event data; 2) determining a discrepancy between the forward projection and the event data 44; 3) back projecting the discrepancy to the domain of the estimate image; and 4) updating the estimate image 54 with the back projection. For select iterations, the estimate image 54 is filtered 106 in the image domain before being back projected to control noise. The filtering can, for example, be performed by a median filter 52.

In some instances, each iteration is broken into a plurality of sub-iterations. Namely, each iteration includes iterating over a plurality of subsets of the received event data to refine the estimate image of the target volume 54 for each subset. This typically includes, for each subset: 1) forward projecting the estimate image 54 to the domain of the subset; 2) determining a discrepancy between the forward projection and the event data 44; 3) back projecting the discrepancy to the domain of the estimate image; and 4) updating the estimate image 54 with the back projection. For select sub-iterations, the estimate image 54 is filtered in the image domain before being back projected to control noise. The filtering can, for example, be performed by a median filter 52.

As used herein, a memory includes any device or system storing data, such as a random access memory (RAM) or a read-only memory (ROM). Further, as used herein, a processor includes any device or system processing input device to produce output data, such as a microprocessor, a microcontroller, a graphic processing unit (GPU), an application-specific integrated circuit (ASIC), an field-programmable gate array (FPGA), and the like; a controller includes any device or system controlling another device or system, and typically includes at least one processor; a user input device includes any device, such as a mouse or keyboard, allowing a user of the user input device to provide input to another device or system; and a display device includes any device for displaying data, such as a liquid crystal display (LCD) or a light emitting diode (LED) display.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A system for iteratively reconstructing an image of a target volume of a subject, said system comprising:
   a reconstruction processor configured to:
   receive event data describing the target volume from an imaging scanner;
   iteratively refine an estimate image of the target volume through repeated comparison of the estimate image to the received event data wherein each iteration includes:
   forward projecting the estimate image to the domain of the event data to generate a forward projection;
   determining a discrepancy between the forward projection and the event data;
   back projecting the discrepancy to the domain of the estimate image; and
   updating the estimate image with the back projection;
   filter the estimate image in the image domain during multiple select refinement iterations to control noise wherein the filtering comprises filtering the estimate image before forward projecting of the iterative refinement such that the filtered estimate image is forward projected; and
   at least one of:
   a displaying device displaying the image estimate after iterative refinement; and
   a memory storing the image estimate after iterative refinement;
   wherein the reconstruction processor is not configured to filter the forward projection.

2. The system according to claim 1, wherein the event data is list-mode data.

3. The system according to claim 1, wherein the event data is sinogram data.

4. The system according to claim 1, wherein the reconstruction processor further:
   filters the estimate image in the image domain for the select iterations using a median filter.

5. The system according to claim 1, wherein the reconstruction processor is configured to filter the estimate image in the image domain during every refinement iteration or during every other refinement iteration to control noise.

6. The system according to claim 1, wherein each iteration includes:
   filtering the estimate image in the image domain; and
   for each of a plurality of subsets of the received event data, refining the estimate image of the target volume through comparison of the filtered estimate image to the subset.

7. The system according to claim 1, further including:
   an imaging scanner, wherein the reconstruction processor receives the event data from the imaging scanner.

8. The system according to claim 1, wherein the imaging scanner includes a time-of-flight positron emission tomography (TOF-PET) scanner.

9. The system according to claim 1, wherein the reconstruction processor is further programmed to:
   iteratively refine two or more interleaved estimate images of the target volume through repeated comparison of the two or more interleaved estimate images to the received event data; and
   filter one of the two or more interleaved estimate images in the image domain using another one of the two or more interleaved estimate images during select refinement iterations to control noise.

10. A non-transitory computer readable medium storing instructions executable by at least one electronic processor to perform a method for iteratively reconstructing an image of a target volume of a subject, said method comprising:
    receiving event data describing the target volume; and
    iteratively reconstructing an image of the target volume by operations including:
    iteratively refining an estimate image of the target volume through repeated comparison of the estimate image to the received event data; and
    filtering the estimate image in the image domain during every other refinement iteration to control noise;
    wherein the reconstruction processor is not configured to filter the forward projection.

11. The non-transitory computer readable medium according to claim 10, wherein the event data is list-mode data.

12. The non-transitory computer readable medium according to claim 10, wherein filtering the estimate image includes filtering with a median filter.

13. The non-transitory computer readable medium according to claim 10, wherein each iteration includes:
   forward projecting the estimate image to the domain of the event data.

14. The non-transitory computer readable medium according to claim 13, where the at least one refinement iteration includes:
   filtering the estimate image;
   forward projecting the filtered estimate image;
   determining a discrepancy between the forward projection and the event data;
   back projecting the discrepancy to the domain of the estimate image; and
   updating the estimate image with the back projection.

15. The non-transitory computer readable medium according to claim 10, wherein each iteration includes:
   filtering the estimate image in the image domain;
   for each of a plurality of subsets of the received event data, refining the estimate image of the target volume through comparison of forward projections of the filtered estimate image to the subset.

16. The non-transitory computer readable medium according to claim 10, further including:
   positioning the target volume within an imaging scanner;
   generating event data describing gamma photons from the target volume using the scanner, the received event data being the generated event data.

17. The non-transitory computer readable medium according to claim 10, further including at least one of:
   displaying the image estimate after iterative refinement; and
   storing the image estimate after iterative refinement.

18. The non-transitory computer readable medium according to claim 10, wherein the method further includes:
   iteratively refining two or more interleaved estimate images of the target volume through repeated comparison of the two or more interleaved estimate images to the received event data; and
   filtering one of the two or more interleaved estimate images in the image domain using another one of the two or more interleaved estimate images during select refinement iterations to control noise.

19. A system for iteratively reconstructing an image of a target volume of a subject, said system comprising:
   an imaging scanner configured to acquire measured data of the target volume of the subject; and
   a reconstruction processor which:
      for each of a plurality of iterations, refines an estimate image of the target volume by forward projecting the estimate image into the domain of the measured data and comparing the estimate image forward projected into the domain of the measured data to the measured data of the target volume of the subject; and
      filters the estimate image in the image domain for each refinement iteration prior to forward projecting the estimate image to control noise wherein the reconstruction processor does not filter the estimate image forward projected into the domain of the measured data.

* * * * *